Sept. 18, 1951  R. C. GRIMM  2,568,191
ADJUSTABLE ALIGNMENT PLATFORM FOR X-RAY TABLES
Filed March 19, 1949
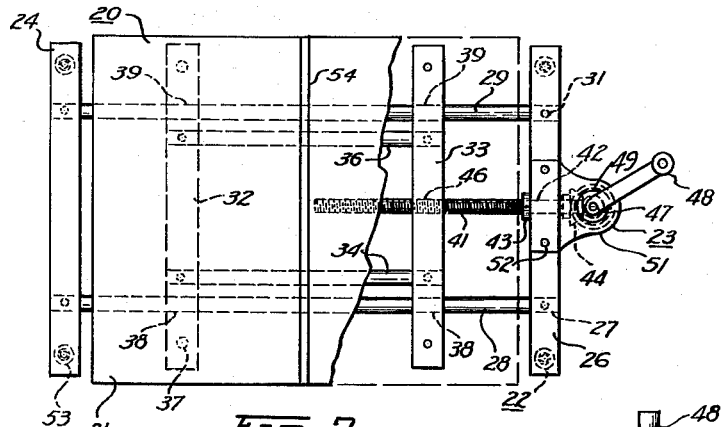
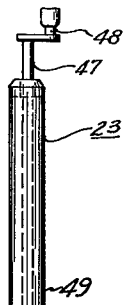
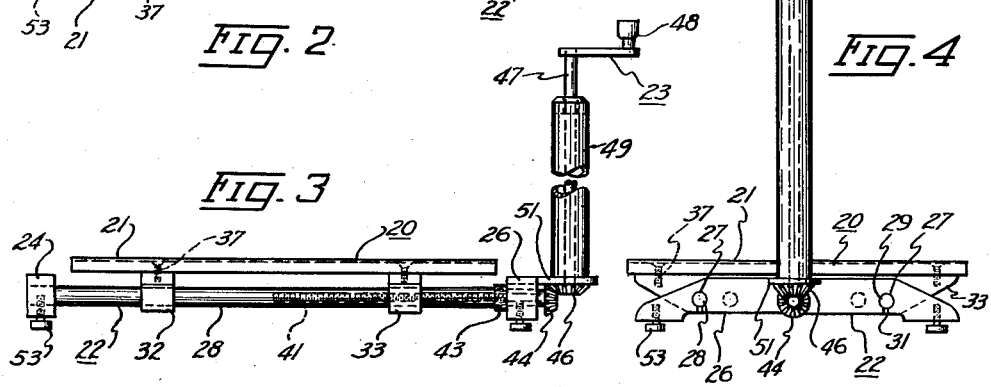
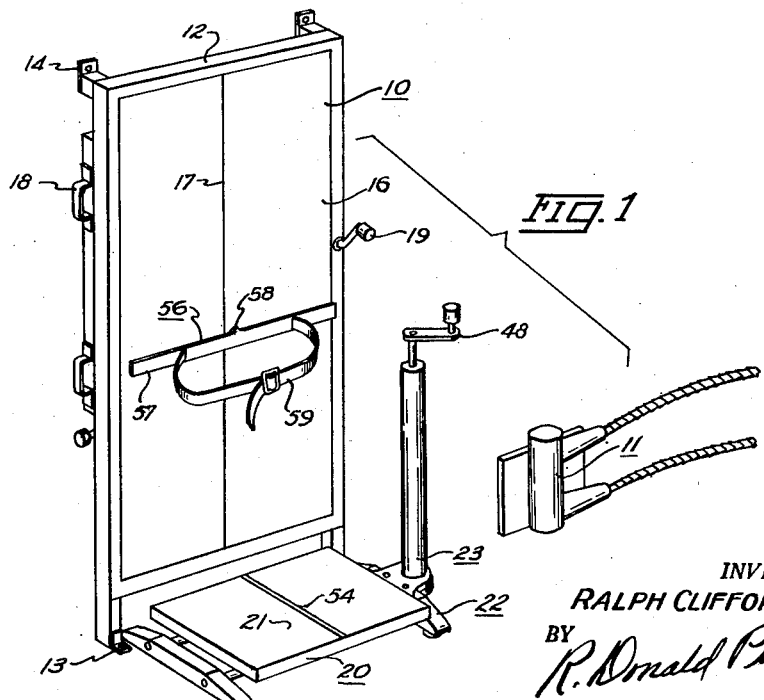
INVENTOR.
RALPH CLIFFORD GRIMM
BY
R. Donald Pitts
AGENT.

Patented Sept. 18, 1951

2,568,191

UNITED STATES PATENT OFFICE 2,568,191

ADJUSTABLE ALIGNMENT PLATFORM FOR X-RAY TABLES

Ralph Clifford Grimm, Cedar Rapids, Iowa

Application March 19, 1949, Serial No. 82,357

2 Claims. (Cl. 311—10)

This invention relates to X-ray equipment and has particular relation to means for adjustably positioning a patient or subject relative to a source of X-rays and to a sensitized film, or fluoroscope when such is used.

It is common practice in the taking of X-ray photographs of the human body and particularly those photographs taken for the study of the skeletal structure, for such photographs to be made while the subject is standing and in his or her normal, relaxed position.

The X-ray equipment normally employed includes an upright wall standard arranged to support and to provide for vertical adjustment of the sensitized film which is enclosed in a light-tight film holder or "cassette" holder positioned behind the wall standard or "wall bucky" as it is called.

It is necessary, for some purposes, that, in using such equipment, the spinal column of the subject be centered as accurately as possible over a vertically positioned reference or centering line provided on the face of the wall standard so as to be thereby aligned with a similarly positioned line of reference provided on the sensitized film. The subject is usually centered in front of the centering line by having him or her move to the right or to the left as necessary. This, however, is a relatively difficult and unsatisfactory procedure since the subject usually finds it very difficult to move the exact distance required. Consequently, it is frequently necessary for the subject to make a great many attempts before reaching a position suitable for taking an X-ray photograph which is acceptable for the purpose for which it is intended.

This method of centering the subject is objectionable for another very important reason also. In attempting to move to one side or the other, the short distances sometimes required, it is natural for the subject to attempt to make the move by shifting his or her body without moving the feet. Thus, the posture becomes unnatural, the weight of the body being borne unequally by the legs and feet of the subject. The entire skeletal structure may be thrown slightly out of its normal or natural relaxed position thus resulting in possible misinformation being given by the X-ray photograph taken of such subject.

Accordingly, it is a primary object of my invention to provide means for quickly, easily and accurately positioning a subject relative to X-ray equipment for the taking of X-ray photographs.

Another primary object of my invention is the provision of a platform support for use in conjunction with X-ray equipment and adapted to support and permit quick, easy and accurate lateral adjustment of the subject relative to such equipment without affecting the natural posture and without causing or resulting in any distortion of the skeletal structure of the subject.

A further object of my invention is the provision of a simple, sturdy device of this nature which is so constructed as to place the platform at a minimum height above the floor.

Other and further features and objects of the invention will be more apparent to those skilled in the art upon a consideration of the accompanying drawing and the following specification, wherein is disclosed an exemplary embodiment of the invention, with the understanding, however, that such changes may be made therein as fall within the scope of the appended claims, without departing from the spirit of the invention.

In the accompanying drawings:

Figure 1 is a general view in perspective illustrating my invention and its relationship to associated portions of a representative type of X-ray machine. A centering gauge is shown in approximately the position it would occupy when strapped to a subject's pelvis.

Figure 2 is a view in top elevation of an adjustable platform support embodying my inventive concept, portions of the device being broken away to better illustrate the structure.

Figure 3 is a view in front elevation of the device of Figure 2, and

Figure 4 is a view in end elevation of the adjustable platform support.

Referring now to these drawings and, in particular, to Figure 1 thereof in which an upright wall standard or wall bucky is indicated at 10, and a representative type of X-ray projector or X-ray tube and its housing are indicated generally at 11, other portions of the X-ray equipment not being shown since they form no part of the present invention. The wall standard 10 comprises a frame 12 rigidly mounted in a vertical position by means of floor and wall attachment feet 13 and 14. Mounted within the frame is a panel 16 of Bakelite, or similar material, having a vertical centering line 17 scribed on the surface thereof. A light-tight film holder or cassette holder 18 is removably mounted on the rear of the wall standard and adapted to be adjusted vertically, as required, by means of the manual adjusting crank 19.

My inventive concept of a means for accurately, easily and quickly positioning a subject relative to a reference line on the wall standard, without causing or furthering any disturbance or distortion of the skeletal structure, is embodied in the platform support shown generally at 20. This device, which is best illustrated in Figures 2 to 4 inclusive, comprises, in general, a platform 21 slidably mounted on an under-frame 22 and adapted to be adjusted laterally on the under-frame by the adjusting mechanism indicated generally at 23.

The under-frame 22 includes spaced end-support bars 24 and 26 apertured as at 27 to receive the ends of spaced parallel slide rails 28 and 29. Set screws 31 secure the rails in position. A sliding frame, comprising slide bars 32 and 33 secured together in spaced relation by spacer bars 34 and 36, is affixed to the under-side of the platform 21 by screws 37, the slide bars being apertured at 38 and 39 for slidable reception on the slide rails 28 and 29.

The threaded feed screw 41 is journalled, at one end, in the end support bar 26, as shown at 42, longitudinal motion of the feed screw being prevented by the collar 43 and bevel or miter gear 44 positioned on opposite sides of the end support bar 26. The slide bar 33 is apertured and threaded at 46 to engage the feed screw 41, longitudinal travel of the platform on the slide rails being secured by rotation of the feed screw through the bevel gear 44 and its companion bevel drive gear 46. This bevel drive gear 46 is attached to the vertical shaft 47, a hand crank 48 being provided at the upper end thereof to facilitate adjustment. A tubular casing 49, adapted to enclose and support the shaft 47, is rigidly affixed to a plate-like mounting member 51 which is, in turn, attached to the end-support bar 26 by the screws 52.

Leveling screws 53 are threadedly engaged on the under surface of and adjacent each end of the end support bars 24 and 26. A centering line 54 is provided on the upper surface of the platform 21 by painting or any other suitable means and transverse to the guide rails.

A centering gauge, as indicated at 56, is employed in conjunction with the platform support. This gauge includes a non-metallic strip or rod 57 preferably of a length the same as the width of the wall standard, an indicating mark or projection 58 being provided midway between the ends thereof. Tie strings or a belt 59 are secured to the gauge 57 to permit it to be strapped to the subject.

The operation and use of the device is as follows. The platform support 20 is positioned directly in front of the wall standard with the centering-line 54 of the platform generally in line with the centering-line 17 of the wall standard. The subject stands erect upon the platform 21 close to the wall standard and with his or her feet positioned on opposite sides of the platform centering-line. The centering gauge 56 is strapped to the subject's pelvis with the centering projection 58 positioned directly over the top center of the sacrum. The operator determines visually whether or not the subject is centered properly by observing the relationship of the ends of the centering guide with the edges of the wall standard. Any correction required is accomplished by simply turning the crank to move the platform to either the right or to the left.

Although I have shown and described a specific embodiment, it will be apparent that modifications of my invention may be made by those skilled in the art. Such modifications may be made without departing from the spirit and scope of my invention as set forth in the appended claims.

I claim as my invention:

1. A device of the character described for laterally positioning a subject relative to X-ray apparatus comprising a generally rectangular frame having spaced, longitudinally extending slide rails, a platform disposed thereabove and having longitudinally spaced slides secured to the underside thereof, said slides having laterally spaced apertures therein for slidable mounting on the slide rails, a threaded feed screw mounted below the platform and parallel with the slide rails, the said feed screw having threaded engagement with one of said slides, means preventing longitudinal displacement of the feed screw, a vertical tubular column affixed to the frame adjacent the outer end of the feed screw, a shaft rotatably mounted in said column, a crank at the upper end of the shaft and a pair of miter gears operatively connecting the adjacent ends of the shaft and the feed screw.

2. In a device of the character described for laterally positioning a subject relative to X-ray apparatus, a supporting frame including a pair of laterally extending, spaced, end-support bars having laterally spaced apertures therein, a pair of longitudinally extending slide rails having the ends thereof received and supported in the said apertures, a platform disposed thereabove, a pair of laterally extending slide bars secured to the underside of the platform and having spaced apertures therein for reception on the slide rails, a longitudinally extending feed screw threadedly engaged in one slide bar and having one end thereof rotatably mounted in an end-support bar, a vertically extending crankshaft, a mounting plate and tubular column affixed to the frame adjacent one end of the feed screw and miter gears operatively connecting the crankshaft and the feed screw.

RALPH CLIFFORD GRIMM.

REFERENCES CITED

The following references are of record in the file of this patent:

UNITED STATES PATENTS

| Number | Name | Date |
|---|---|---|
| 992,066 | Roberts | May 9, 1911 |
| 1,173,646 | Blue | Feb. 29, 1916 |
| 1,582,950 | Weaver | May 4, 1926 |
| 1,676,746 | Reid | July 10, 1928 |
| 1,756,932 | Baeher | May 6, 1930 |
| 2,290,191 | Karlson | July 21, 1942 |
| 2,370,048 | Koch | Feb. 20, 1945 |
| 2,470,161 | Glasin | May 17, 1949 |
| 2,498,392 | Boyle | Feb. 21, 1950 |